(12) United States Patent
Stanger et al.

(10) Patent No.: US 6,171,630 B1
(45) Date of Patent: Jan. 9, 2001

(54) METHOD AND APPARATUS FOR GENERATING AND APPLYING STEAM FOR FOOD COOKING AND FINISHING

(75) Inventors: Keith A. Stanger, New Port Richey, FL (US); Donald Ross Bedwell, Columbia City; Mitchell C. Henke, Ft. Wayne, both of IN (US); Robert J. Wenzel, New Port Richey, FL (US)

(73) Assignee: Lincoln Foodservice Products, Inc., Fort Wayne, IN (US)

( * ) Notice: Under 35 U.S.C. 154(b), the term of this patent shall be extended for 0 days.

(21) Appl. No.: 09/268,516

(22) Filed: Mar. 12, 1999

(51) Int. Cl.$^7$ ........................................................ A21B 1/08
(52) U.S. Cl. ............................ 426/510; 426/511; 99/468; 99/477
(58) Field of Search .................................... 426/510, 511; 99/468, 477

(56) References Cited

U.S. PATENT DOCUMENTS

| | | |
|---|---|---|
| 4,159,675 | 7/1979 | Schwarz et al. . |
| 4,179,985 | 12/1979 | Baker et al. . |
| 4,197,791 | 4/1980 | Vieceli et al. . |
| 4,617,908 | * 10/1986 | Miller et al. ........................... 126/20 |
| 4,701,340 | 10/1987 | Bratton et al. . |
| 5,240,730 | 8/1993 | Jamet . |
| 5,367,951 | 11/1994 | Purvis . |
| 5,395,623 | 3/1995 | Kovach . |
| 5,501,142 | 3/1996 | Bailey . |
| 5,603,255 | 2/1997 | Nouvelot et al. . |
| 5,931,083 | * 8/1999 | Stanger et al. ......................... 99/388 |

* cited by examiner

Primary Examiner—Nina Bhat
(74) Attorney, Agent, or Firm—Ohlandt, Greeley, Ruggiero & Perle, llp

(57) ABSTRACT

Food cooking apparatus for melting cheese disposed on a food product. The cheese topped food product, for example a bun half, burger patty and cheese stack, is transferred in and out of a cooking chamber by a trolley. Entry of the trolley to the cooking chamber starts a cooking cycle. A steam generator provides pressurized steam from a location just above the cheese by a distance of up to about 2.0 inches for a short time until the cheese is melted. The trolley carries a transport medium upon which the food product is placed. A plurality of holes is disposed in the medium to remove from it any water formed by condensation. The steam generator includes a heated platen and a lid that form a steam generating chamber. Water is injected into the chamber onto the heated platen in a small enough quantity that substantially all of the water is converted to steam substantially instantaneously. The steam quickly pressurizes the chamber and is forced through passageways disposed in bosses that extend from the platen into the chamber. The steam exits the passageways on the outside surface of the platen.

15 Claims, 7 Drawing Sheets

METHOD AND APPARATUS FOR GENERATING AND APPLYING STEAM FOR FOOD COOKING AND FINISHING

FIELD OF INVENTION

This invention relates to a method and a food cooking/finishing apparatus and in particular to a method and a food cooking apparatus using steam heat to rapidly heat food products. The invention also involves a method and a generator for producing steam for food cooking equipment and to a water supply device and process for the steam generator.

BACKGROUND OF INVENTION

In the fast food industry there is a need to prepare a large number and broad menu of food products in a short period of time with high quality. When the food products include dough products such as bread or buns, it is particularly important to maintain moisture and temperature without making the bread soggy. It is also important to maintain color, texture and mouth feel of the bread product for the consumer.

The use of steam heat in food cooking apparatus is described in U.S. patent application, Ser. No. 08/929,716, filed Sep. 14, 1997, entitled "Apparatus and System for Conditioning Food Products" and assigned to the owner of this application. This application introduces steam from the bottom of a cooking chamber intended to condition and carmelize buns. The application mentions that one of the things to avoid in the use of steam heat is direct contact of water or condensate with the bun as this can cause unappealing whitish, gray or faded spots on the bun surface.

U.S. Pat. No. 4,701,340 discloses a pizza oven having three in line cooking chambers. Hot air impingement heating is used in the first and third chambers. The second or middle chamber uses hot air impingement on the bottom surface of the pizza and impingement by high velocity steam jets on the top surface of the pizza. The steam jets are provided from a plurality of apertured tubes arranged in parallel and above the pizza. Steam is provided to the apertured tubes from a conventional steam generator. The apertures are located between 1.5 and 2.5 inches above the pizza. The patent states that if the spacing is too close, the high velocity steam jets may blow the toppings off the pizza. In the cooking process, the steam condenses to form a layer of water on the top surface of the pizza. The layer of water is evaporated in the third cooking chamber.

Other patents, of which the inventor is aware, that disclose cooking equipment using steam heat include U. S. Pat. Nos. 4,159,675, 4,179,985, 4,197,791, 5,240,730, 5,367,951, 5,395,623, 5,501,142 and 5,603,255.

Another prior art cooking/finishing appliance cooks or finishes a food product by applying steam from above the food product. This appliance has a manual pump that pumps water from a reservoir to a steam generating chamber located above a cooking chamber. The water flashes onto a heated surface in the steam generating chamber. The steam escapes through an orifice on the heated plate into a distribution chamber. The distribution chamber has a distributor plate situated above the food product in the cooking chamber. The steam is then distributed through holes in the distributor plate into the food cooking chamber. Because the orifice is located on the same surface where the water is flashed, water that does not convert to steam may escape through the orifice into the distribution chamber and then through the distributor plate holes into the cooking chamber where it drips onto the food product.

An object of the present invention is to provide an improved method and food cooking apparatus particularly suited to melting cheese on a food product without the disadvantage of discoloring the food or degrading its texture.

Another object of the present invention is to provide a method and a food cooking apparatus that uses steam heat to melt cheese or heat food portions without forming a layer of water on the food product.

Still another object of the present invention is to provide a method and a food cooking apparatus that uses steam heat to melt cheese on a food product that contains bread without making the bread soggy.

Yet another object of the present invention is to provide an improved method and a generator for producing steam for food cooking apparatus.

A further object of the present invention is to provide an improved steam generator that is compact enough for table top cookers.

A still further object of the present invention is to provide a novel and improved steam generator with a recirculating water supply system.

Another object of the present invention is to provide a novel and improved cooking apparatus with a recirculating water supply system.

SUMMARY OF INVENTION

Food cooking apparatus according to the present invention is provided to rapidly heat a food product for cooking and/or finishing purposes. It is especially useful to melt a quantity of cheese on a food product such as a burger patty disposed on a bun half, bread, pizza and the like. The cooking apparatus includes a cooking chamber, a transport for holding the food product, a transport medium along which the transport is movable between first and second positions into and out of the cooking chamber and a means for dispensing steam into the cooking chamber from a location above the food product during a cook cycle when the transport is within the chamber.

In a preferred embodiment, the transport has a surface upon which the food product is situated. The surface contains at least one hole to drain any water condensed by the steam. A set of wheels is mounted on the transport to form a trolley that is movable along the transport medium. A spring is provided to automatically eject the trolley at the end of the cooking cycle. The trolley medium is shaped to provide gravity assisted removal of the trolley from the cooking chamber.

The means for dispensing steam is a heated platen having a top and a bottom surface. The bottom surface forms the ceiling of the cooking chamber. The top surface and a lid form a steam generating chamber. One or more bosses extend from said top surface toward said lid. Water is injected into the steam chamber onto the heated top surface of the platen in a small enough quantity that substantially all of the water is substantially instantaneously converted to steam. The steam is forced through narrow passageways that have entrances in the tops of the bosses and exits in the bottom surface of the platen.

In an alternate embodiment of the present invention, the food cooking apparatus has a cooking chamber for receiving a food product to be heated and a steam generator for dispensing steam into the cooking chamber to heat the food product. A water recirculating loop develops a water volume at a pressure of about 0 psi. A pump is operable to pump a quantity of water from the water volume to the steam generator. The water recirculating loop includes a water supply that provides water at a relatively high pressure and flow rate, a flow controller that converts the high pressure and flow rate to a relatively low pressure and flow rate, and a reservoir that contains the water volume. The reservoir is filled with water from the flow controller at the relatively low pressure and flow rate with any water in excess of a set reservoir volume being drained off and returned via a drain line to the water supply.

A method of melting cheese on a surface of a food product according to the present invention comprises inserting the food product into a cooking chamber and then applying pressurized steam to said cheese during a first part of a cooking cycle. The food product is held in the cooking chamber after said steam has been applied until the end of the cooking cycle. Preferably, the steam is applied for a time in the range from about 1.5 to 5.0 seconds. Preferably, the first part of the cooking cycle is about 20 to 25% of the cooking cycle.

The method also may include the steps of automatically ejecting the food product at the end of the cooking cycle, removing condensation from the cooking chamber or forming the steam by applying a quantity of water to a hot plate in a steam chamber.

A steam generator for food cooking apparatus according to the present invention includes a platen having top and bottom surfaces. The platen is adapted to be heated to a temperature in excess of the boiling temperature of water and preferably in the range from about 330° F. to 405° F. A lid is sealed to the platen top surface to form a steam generating chamber. A passage way is provided having an entrance at a location in the chamber a distance above the top surface and exit from the bottom surface. A water injection means injects water onto the heated platen top surface. The water vaporizes substantially instantaneously to form steam that pressurizes the chamber and departs from the chamber via the passageway.

Preferably the passageway is one of a plurality of passageways formed as bores in a plurality of bosses extending from the platen top surface. The height of the bosses is preferably at least about one half the distance between the upper surface and the lid.

In an alternate embodiment of the present invention, the steam generator has a water recirculating loop that develops a water volume at a pressure of about 0 psi. A pump is operable to pump a quantity of water from the water volume to the steam generator. The water recirculating loop includes a water supply that provides water at a relatively high pressure and flow rate, a flow controller that converts the high pressure and flow rate to a relatively low pressure and flow rate, and a reservoir that contains the water volume. The reservoir is filled with water from the flow controller at the relatively low pressure and flow rate with any water in excess of a set reservoir volume being drained off and returned via a drain line to the water supply.

A method for generating steam for a food cooking chamber according to the present invention comprises:
  heating a platen to a temperature in excess of the boiling temperature of water;
  applying a quantity of water to a top surface of the heated platen, the quantity being small enough that substantially all of the water is instantaneously converted to steam; and
  forcing the steam through a narrow passageway having an entrance a distance above the top surface of the platen and an exit into the cooking chamber.

Preferably the temperature is in the range from about 330° F. to 405° F.

Preferably the passage way entrance is in the top of a boss extending from said top surface and the exit is in a bottom surface of said platen.

BRIEF DESCRIPTION OF DRAWINGS

Other and further objects, advantages and features of the present invention will be understood by reference to the following specification in conjunction with the accompanying drawings, in which like reference characters denote like elements of structure and.

DESCRIPTION OF PREFERRED EMBODIMENTS

Food cooking and/or finishing apparatus according to the present invention is intended for use in rapidly heating a food portion. It is particularly useful to melt a quantity of cheese in grated or slice form disposed on the top of a food product, such as a burger stack comprised of a bun half and burger patty that have been already been cooked or conditioned. The burger patty can be formed of chopped food of any kind such as meat or vegetables. By way of example, the food product will be described herein as a cheese topped burger patty.

Figure 1:
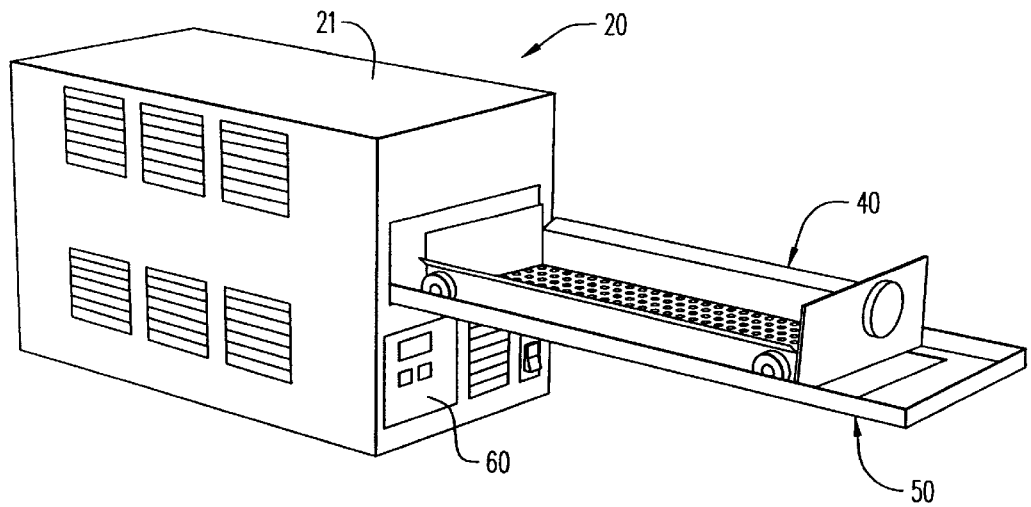
FIG. 1 is a perspective view of a food cooking/finishing apparatus according to the present invention.
Figure 2:
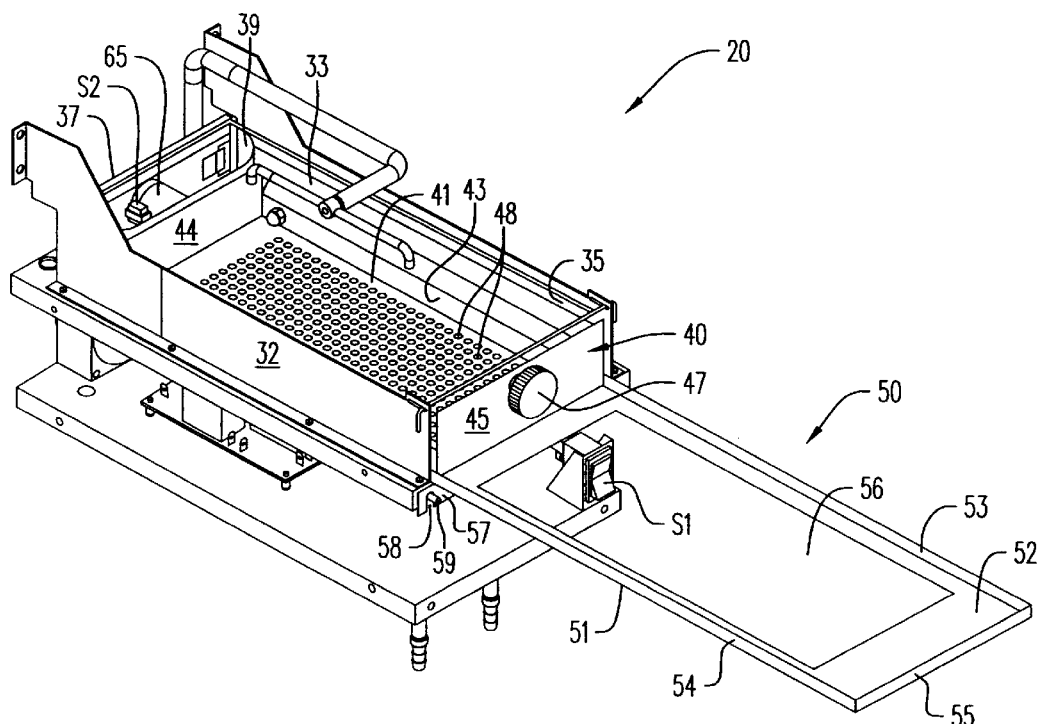
FIG. 2 is a perspective view of the cooking/finishing apparatus of FIG. 1 with the enclosure removed.
Figure 3:
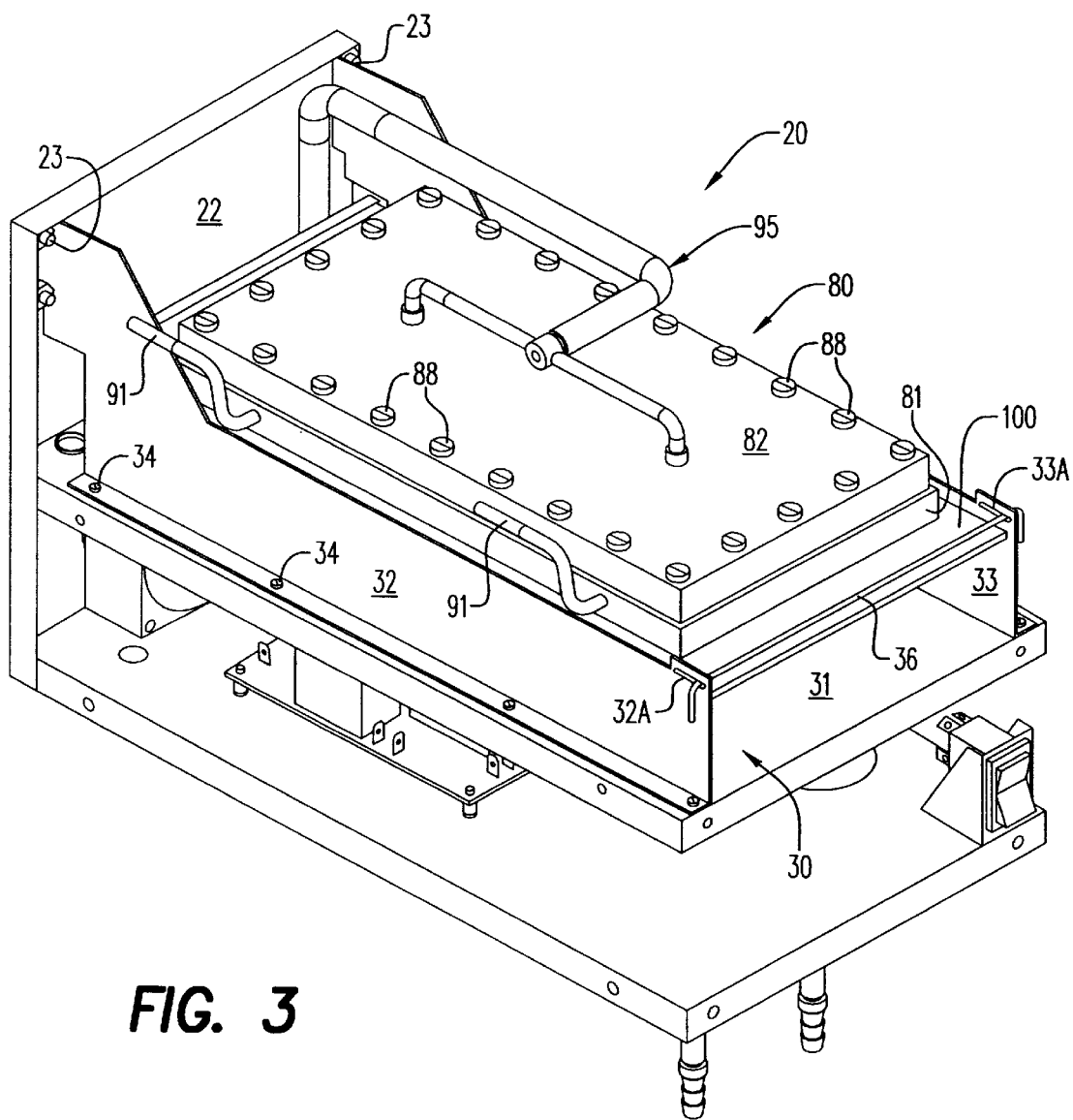
FIG. 3 is perspective view of the cooking/finishing apparatus of FIG. 2 with the with the steam generator in place and the food transport and transport medium removed.

With reference to FIGS. 1 through 3, there is provided a food cooking/finishing apparatus according to the present invention generally represented by numeral 20. Food cooking apparatus 20 includes an enclosure 21, a cooking chamber 30, a steam generator 80, a food product transport 40, a transport medium 50 and a control panel 60.

One or more food products with a cheese topping (not shown) is arranged on transport 40 for transfer into and out of cooking chamber 30 along transport medium 50. In one design embodying the invention, transport 40 has dimensions to support up to three four inch diameter burgers or up to two five inch diameter burgers. Steam generator 80 is arranged to distribute steam directly on the top of the cheese for a short period of time to melt the cheese. At the end of this time, transport medium 40 is transferred out of cooking chamber 30 along transport medium 50.

Cooking chamber 30 has a base 31. A back wall 37 and a pair of side walls 32 and 33 that are attached to base 31 by means of a suitable fastener, such as screws 34. Side walls 32 and 33 are attached to a back wall 22 (see FIG. 3) of enclosure 21 by means of a suitable fastener, such as bolts 23. Similarly, base 31 is attached to back wall 22 by a suitable fastener (not shown).

Cooking chamber 30 is defined on four sides by base 21, side walls 32 and 33 and back wall 37. Steam generating device 80 forms the top wall of cooking chamber 30. The front wall of cooking chamber 30 is formed by a front wall 45 of food transport 40.

Food transport 40 is formed in a box shape having a tray 41, side walls 42 and 43, back wall 44 and front wall 45. Food transport 40 is arranged for travel like a trolley along transport medium 50. To this end, a set of four trolley wheels 46 are disposed as front and back wheels on side walls 42 and 43. Back and front walls 44 and 45 extend vertically above tray 41 sufficiently to form back and front walls of cooking chamber 30 when trolley transport 40 is moved into chamber 30. Trolley front wall 45 has a handle 47 that extends outwardly therefrom to facilitate manual movement of trolley transport 40 along transport medium 50 into cooking chamber 30. Tray 41 in the illustrated embodiment is formed integrally or fixedly coupled to food transport 40. Alternatively, tray 41 may be removably situated on side walls 42 and 43, back wall 44 and front wall 44.

Tray 41 is arranged for holding cheese topped food products. Tray 41 contains a plurality of perforations or apertures 48 through which any water formed by condensation (condensate) is removed to transport medium 50.

Figure 5:
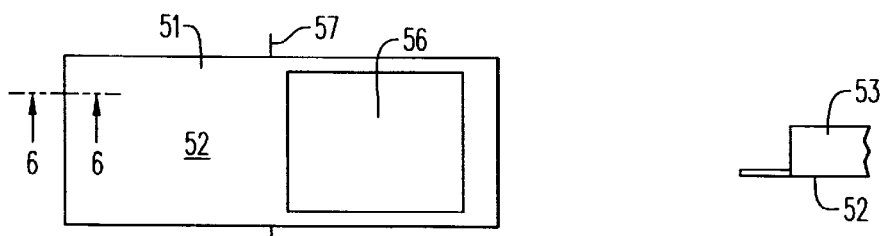
FIG. 5 is a plan view of the transport medium of FIG. 1.
Figure 6:
FIG. 6 is a view taken along line 6—6 of FIG. 5.
Figure 7:
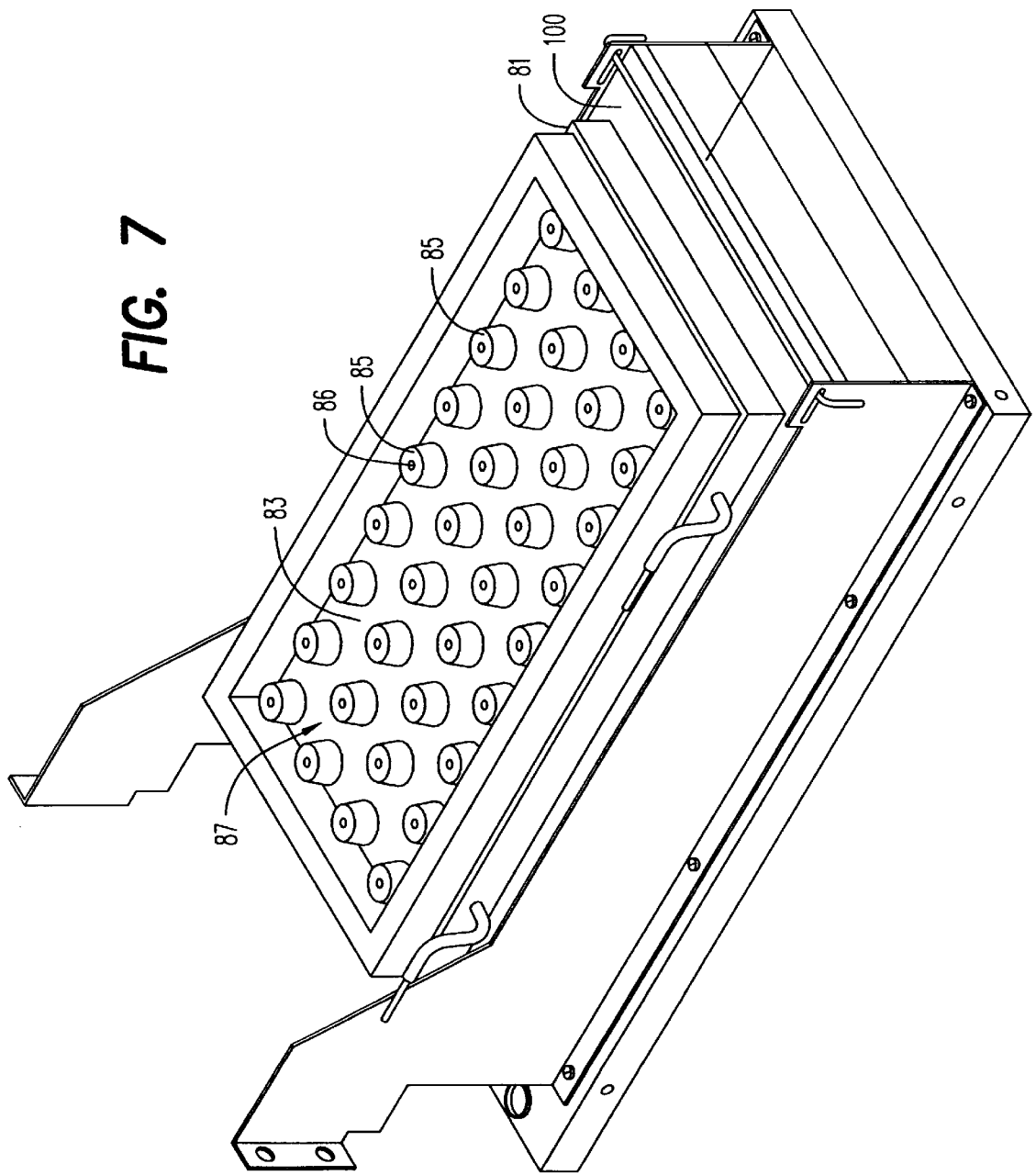
FIG. 7 is a perspective view of a steam generator according to the present invention.
Figure 8:
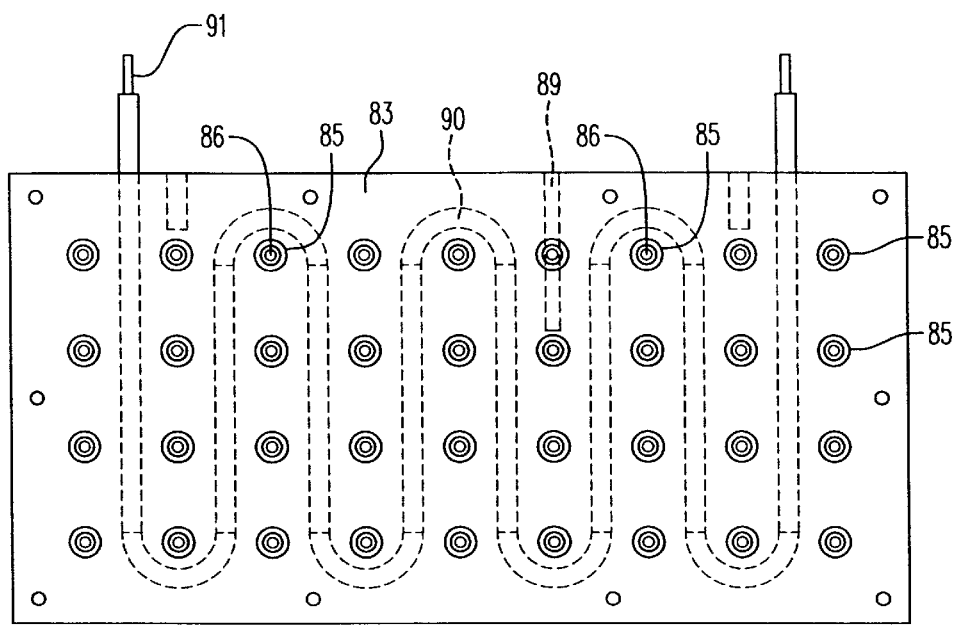
FIG. 8 is a top view of FIG. 7.
Figure 9:
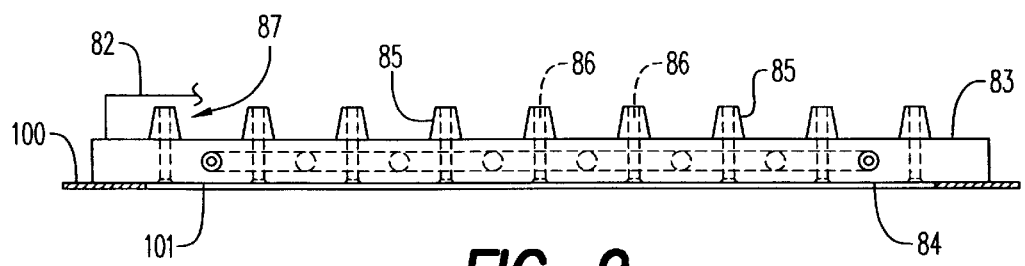
FIG. 9 is a side view of FIG. 8.

Referring to FIGS. 2, 5 and 6, transport medium 50 comprises a trolley course 51 upon which trolley transport 40 is arranged to travel into and out of cooking chamber 30. Trolley course 51 has a trolley bed 52 bounded on opposed sides by side walls 53 and 54 and a front end wall 55. Trolley bed 52 has an aperture 56 disposed in the portion of trolley course 50 that is outside cooking chamber 30 in FIG. 2. The size of aperture 56 is such as to leave enough room for trolley wheels 46 to travel trolley bed 52 as trolley transport 40 moves into and out of cooking chamber 30.

Referring to FIG. 2, trolley medium 50 is partly disposed within cooking chamber 30 with the portion of trolley bed 52 that contains aperture 56 extending outwardly from cooking chamber 30 by a sufficient distance to allow trolley transport 40 to be withdrawn to the position shown in FIG. 1 for loading and unloading of food products to and from tray 41. Trolley course 51 is slightly inclined by about 5° to the horizontal for gravity assisted removal of trolley 40 from cooking chamber 30 as well as gravity assisted drainage of water condensation that drips through apertures 48 of tray 41.

To mount trolley course 51 to cooking chamber 30; a bracket 57 extends from the bottom of trolley bed 52 and slightly outward from sides 53 and 54. A slot 58 disposed in bracket 57 mates with a pin that projects from base 31 on the side of side wall 51. Although not shown in FIGS. 2 and 5, it is understood that a similar slot and pin are located at the opposite side of bracket 57 adjacent wall 53 and base 31.

Referring to FIG. 2, a steaming cycle is started by pushing trolley transport 40 into cooking chamber 30. As trolley 40 travels into cooking chamber 30, back wall 44 engages and compresses a spring 39. As trolley is urged further into cooking chamber it engages and actuates a switch S2.

When switch S2 is actuated, an electromagnet 65 is energized to magnetically hold trolley back wall 44 and latch trolley transport 40 within cooking chamber 30, thereby holding spring 39 in a compressed state. Actuation of switch S2 also starts a timer within control panel 60 that initiates a cooking cycle that controls steam generator 80 to deliver steam to cheese topped food products carried on tray 41. At the end of the cooking cycle, switch S2 is deactuated to thereby deenergize electromagnet 65 to unlatch and release trolley 40.

When electromagnet 65 is deenergized, spring 39 decompresses to eject trolley 40 from cooking chamber 30. Spring 39 exerts a return force on back wall 44 to impel trolley 40 along trolley course 51. The exiting travel of trolley 40 is gravity assisted by the slight ramp inclination of trolley course 51.

Figure 4:
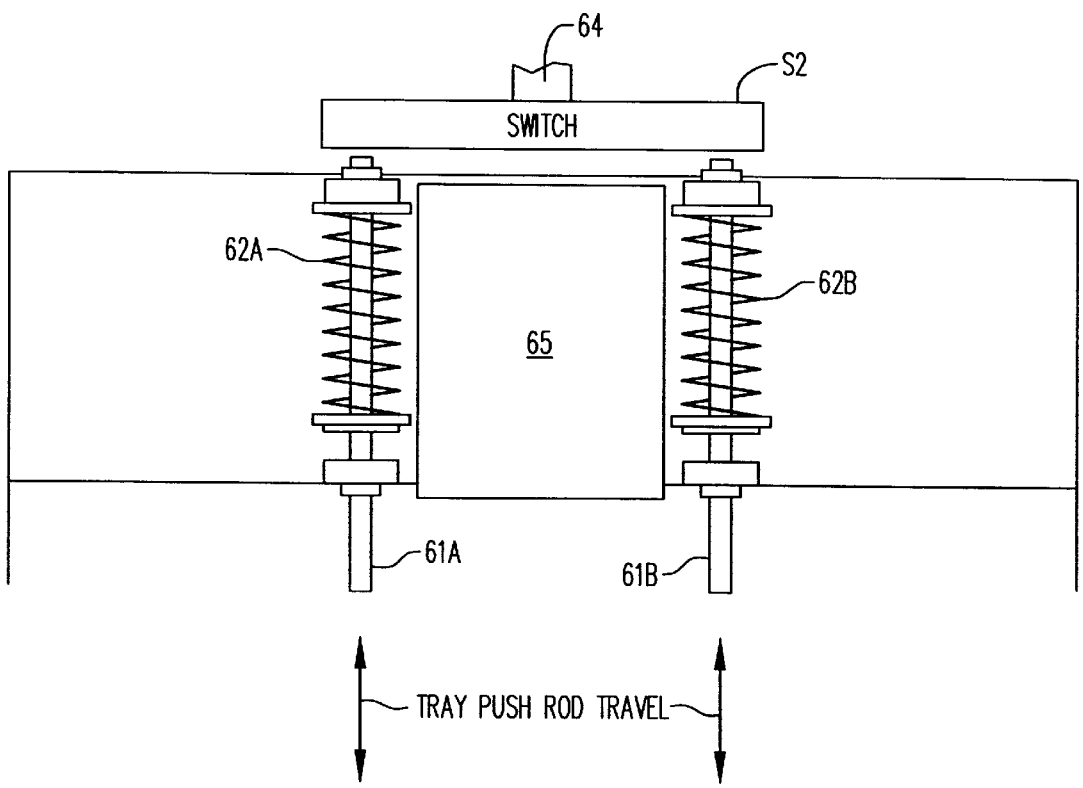
FIG. 4 is a block diagram view in part and a schematic view in part of an alternate food transport ejection mechanism of the food cooking/finishing apparatus.

Referring to FIGS. 2 and 4, an alternate embodiment of the eject mechanism is shown. For illustrative purposes, switch S2 is shown in block diagram form. Spring 39 is replaced by a pair of push rods 61A and 61B and associated springs 62A and 62B. As trolley 40 moves into cooking chamber 30, it contacts push rods 61A and 61B and moves them to actuate switch S2. Switch S2 is mounted to enclosure 21 by mounting means 64. Springs 62A and 62B are mounted on push rods 61A and 62B, respectively. As push rods 61A and 61B are pushed toward switch S2, springs 62A and 62B are compressed.

When switch S2 is actuated, electromagnet 65 is energized to magnetically hold trolley back wall 44, latch trolley transport 40 within cooking chamber 30 and hold springs 62A and 62B in a compressed state. Actuation of switch S2 also starts a timer within control panel 60 that initiates a cooking cycle that controls steam generator 80 to deliver steam to cheese topped food products carried on tray 41. At the end of the cooking cycle, switch S2 is deactuated to thereby deenergize electromagnet 65 to unlatch and release trolley 40.

When electromagnet 65 is deenergized, springs 62A and 62B decompress to move push rods 61A and 61B in a direction to eject trolley 40 from cooking chamber 30. Springs 62A and 62B exert a return force on back wall 44 to impel trolley 40 along trolley course 51.

Referring to FIGS. 3 and 7 through 9, steam generator 80 includes a platen 81, a lid 82 and a water injection means 95. Platen 81 has a top surface 83 and a bottom surface 84. A plurality of bosses 85 extend vertically from top surface 83. A plurality of bores 86 extends through different ones of bosses 85 and through platen 81 to bottom surface 84, thereby forming a plurality of small passageways to distribute steam from bottom surface 84. An electrical heating coil 90 is disposed within platen 81 with external terminals 91 for connection to electrical energy. A temperature probe 89 is embedded in platen 81 for temperature regulation purposes.

Lid 82 is disposed over top surface 83 and bosses 84 to form a steam generating chamber 87. To this end, lid 82 is sealed to platen 81 by a gasket (not shown) by means of screw fasteners 88. Water injection means 95 includes a feed tube or conduit 96 that is joined at union 97 to a pair of distribution tubes 98 and 99. Tubes 98 and 99 extend through lid 82 into steam generating chamber 87 in registry with an area of surface 83 in between bosses 85. Water is fed through tubes 96, 98 and 99 by a water supply system to be described hereinafter.

During a cook cycle, water is fed via tubes 96, 98 and 99 onto top surface 83 of platen 81 which has been preheated to a temperature in excess of 300° F., preferably between 300° F. and 450° F., more preferably between 330° F. and 405° F. The water upon contacting preheated top surface 83 is converted substantially instantaneously to steam that pressurizes steam generating chamber 87 and is fed via bores 86 out of bottom surface 84. Water is injected in bursts, as a continuous stream or preferably as droplets onto top surface 83 during the cook cycle.

Bosses 85 extend into steam chamber 87 by an amount sufficient to avoid spill or splash over of water into bores 86. In one design embodying the invention, bosses 85 extend about 0.5 inch above top surface 83 and about 40 to 60% of the distance between top surface 83 and lid 82.

Bottom surface 84 of platen 81 forms the top wall of cooking chamber 30. The distance between bottom surface 84 and the top of the cheese topped food product is up to about 2.0 inches. This distance has been found to suitably melt the cheese without condensation on the food product. Due to the longer distance to tray 41, condensate may form on tray 41. Any condensate formed on tray 41 is removed from cooking chamber 30 via apertures 48 to trolley bed 52, where it drains by gravity assistance toward aperture 56 outside cooking chamber 30.

Referring to FIGS. 2, 3, 7 and 9, screws 88 fasten lid 82 and platen 81 to a base frame 100. Base frame 100 contains a central opening 101 that is large enough to expose bores 86 to cooking chamber 30. Base frame 100 rests on a ledge 35 that extends along side walls 32 and 33. A rod 36 holds base frame in place by extending through a pair of slots 32A and 33A in side walls 32 and 33.

Figure 11:
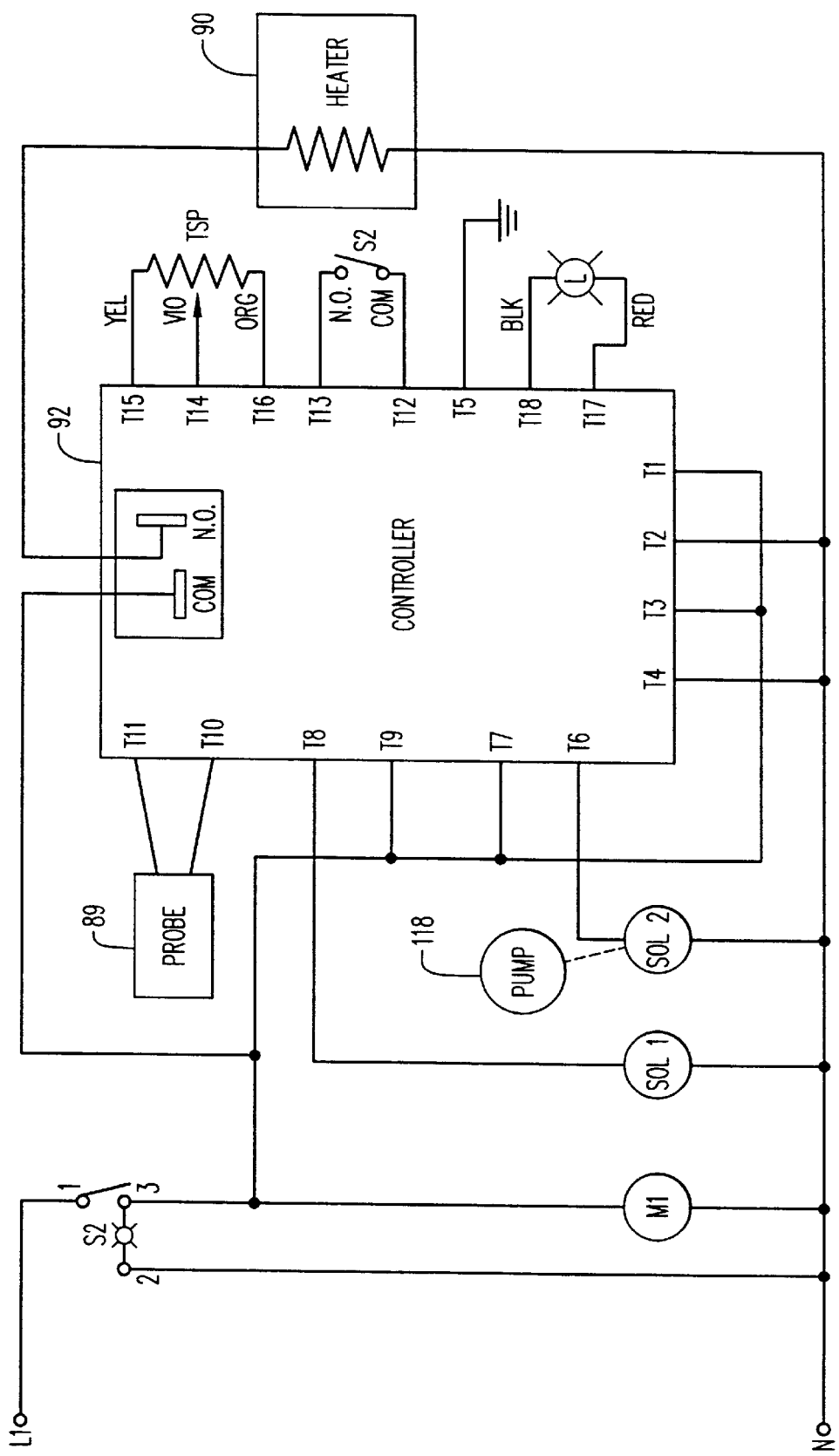
FIG. 11 is a block diagram of a portion of the water supply system of FIG. 10.
Figure 10:
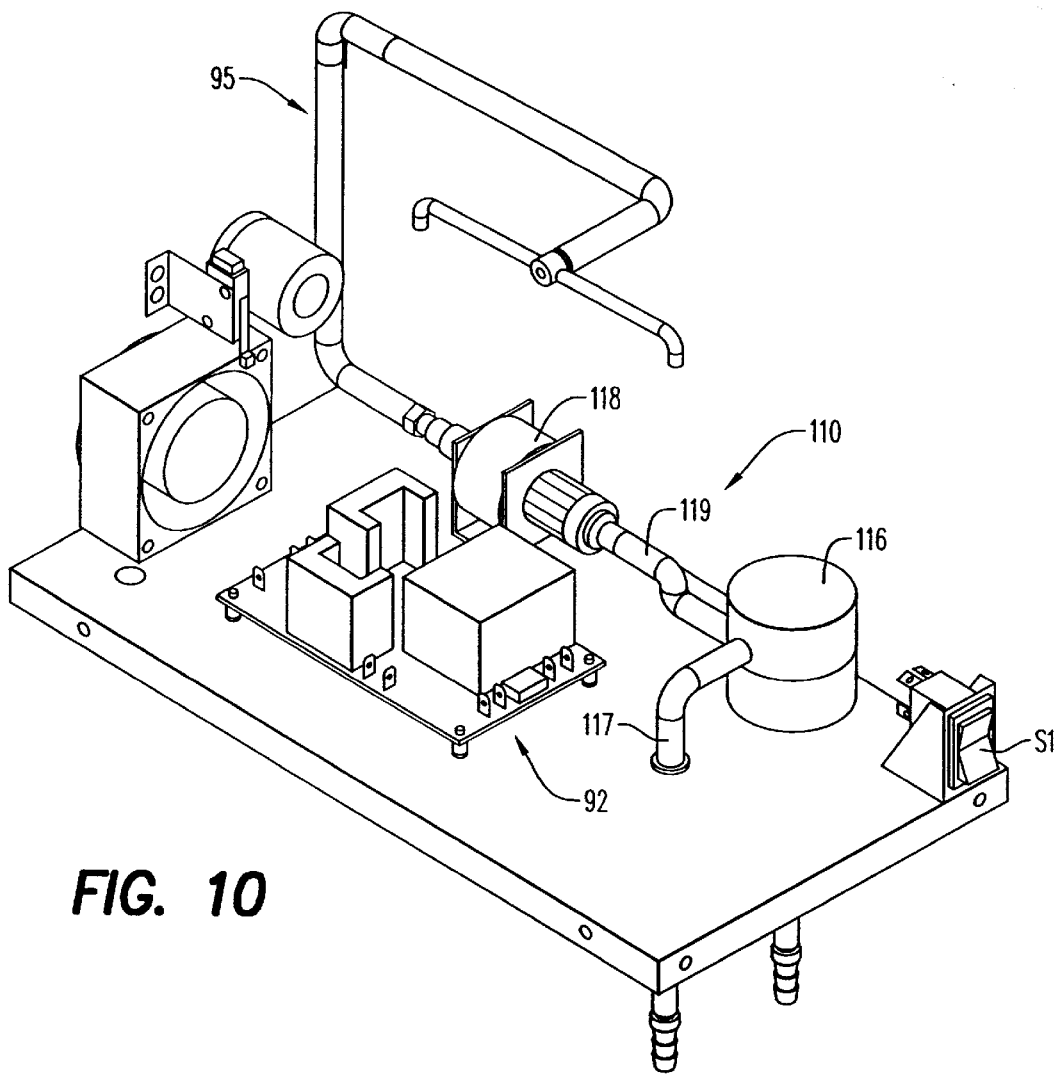
FIG. 10 is a perspective view of the water supply feed system for the steam generator of FIG. 7.

Referring to FIGS. 10 and 11, a water supply system 110 has a water source 112, a flow control valve 114, a reservoir 116 and a pump 118.

Water supply 112 is preferably a tank of distilled water with a pump that supplies water over line 113 to flow control valve 114 at relatively high pressure, such as about line pressure of 60 pounds per square inch (psi). Flow control valve functions to convert the pressure to a relatively low pressure and flow rate in a line 115 to reservoir 116. For example, the output pressure developed in line 115 is about 0.5 psi. Water supply 112 and flow control valve 114 are conventional items that are commercially available.

When reservoir 116 becomes filled to a set reservoir volume at the level of drain line 117, water drains off via line drain 117 to water supply 112. Thus, water supply 112, flow control valve 114 and reservoir 116 function as a recirculating water supply to a line 119 that connects from reservoir 116 to pump 118. Reservoir 116 is prevented from being pressurized by the drain off of excess water by way of drain line 117 located near the top of reservoir 116. That is, reservoir 116 contains a water volume at about 0 psi.

When a cooking cycle is initiated, pump 118 is turned on for a long enough time to supply a small quantity of water via water injection means 95 to steam generating chamber 87. For the example of melting cheese, the water quantity is about two to four tablespoons supplied over a time of about two seconds. Pump 118 is operated to either supply the water quantity as a continuous stream, bursts or droplets during this time.

Figure 12:
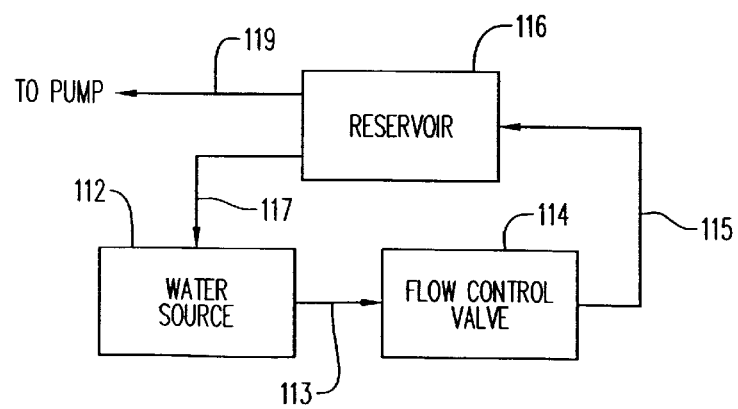
FIG. 12 is a block diagram of the electrical controller of the food cooking/finishing apparatus of FIG. 1.

Referring to FIGS. 11 and 12, an electrical controller 92 is arranged to control the preheating of heater coil 90, the energizing and deenergizing of electromagnet 65 and pump 118 for supplying water to water injection means 95. Controller 92 is connected to receive operating power via a power ON/OFF switch S1 from a pair of power terminals L1 and N. Power terminals L1 and N are adapted to receive an a. c. voltage from a standard a. c. voltage supply of typically 110 to 120 volts. This voltage is applied via ON/OFF switch S1 to a set of terminals T1, T2, T3, T4, T7, T9 and COM of controller 92.

When ON/OFF switch S1 is closed, controller 92 applies voltage from a pair of its terminals N.O. and T2 to heating coil 90. Controller 92 monitors the temperature of platen 81 from a pair of its terminals T10 and T11 that are connected to temperature probe 89. When the temperature reaches the desired set point temperature, controller 92 turns on an LED indicator L via a pair of its terminals T17 and T18 and thereafter regulates the voltage applied to heater coil 90 to maintain the set point temperature, which for a preferred embodiment is in the range of about 330 to 405° F.

Controller 92 has a pair of terminals T12 and T13 across which is connected to switch S2. Controller responds to closure of switch S2 by trolley 40 to initiate a cook or cheese melt cycle. The cooking cycle set time can be set by operation of a time set potentiometer TSP connected with a set of three terminals T14, T15 and T16. The cooking cycle set time for cheese melting is about 1 to 7 seconds, preferably about 2 seconds. The cheese topped burger patty is then held in cooking chamber for about seven more seconds before operating the ejection mechanism. The cooking cycle set time and holding time vary depending on the food product.

Controller 92 has a terminal T6 connected to a solenoid Sol 2 that is associated with pump 118. At the onset of the cooking cycle, controller 92 actuates solenoid Sol 2 to turn on pump 118 to flow water through water injection means 95 onto heated top surface 83 of platen 81. Controller 92 maintains solenoid Sol 2 actuated for a long enough time for pump 118 to pump an adequate amount of water to steam generating chamber 87. As described above, pump 118 is operable for about a two second set time for the cheese topped burger patty example to supply approximately two to four tablespoons of water.

Controller 92 has a terminal T8 connected to a solenoid Sol 1 that is associated with electromagnet 65. Controller 92 responds to closure of switch S2 to actuate solenoid Sol 1 to energize electromagnet 65 to latch trolley 40 to cooking chamber 30. When the cooking cycle ends, controller 92 deenergizes solenoid Sol 1 to deenergize electromagnet 65 and thereby release trolley 40 for automatic ejection from cooking chamber 30.

It will be apparent to those skilled in the art that controller 92 may be any similar control that digitally selects and maintains steam generator temperature, steam set time and holding time.

A method of melting cheese on a surface of a food product according to the present invention comprises applying pressurized steam to the surface from a distance of one inch or less from said surface for a time to melt the cheese. Preferably, the steam is applied for a time in the range from about five to ten seconds. Preferably the distance is about 0.20 to one inch and more preferably in the range from about 0.25 to 0.50 inch.

The method of melting cheese further includes removing condensate from a surface upon which the food product is situated. The steam is produced by applying a quantity of water to a hot plate in a chamber.

A method for generating steam for a food cooking chamber according to the present invention comprises:
  heating a platen to a temperature in excess of the boiling temperature of water;
  applying a quantity of water to a top surface of the heated platen, the quantity being small enough that substantially all of the water is instantaneously converted to steam; and
  forcing the steam through a narrow passageway having an entrance a distance above the top surface of the platen and an exit into the cooking chamber.

Preferably the temperature is in the range from about 330° F. to 405° F.

Preferably the passage way entrance is in the top of a boss 85 extending from top surface 83 and the exit is in bottom surface 84 of platen 81.

Preferably the distance is in a range of about 40 to 60% of the height of steam chamber 87 formed by the platen top surface 83 and lid 82.

Transport 40 and transport medium 50 may take on other forms in alternative embodiments according to the present invention. Thus, transport medium 50 may be a conveyor belt that transfers transport 40 into and out of cooking chamber 30. The conveyor belt may stop transport 40 for the cook cycle duration in cooking chamber 30. Alternatively, the conveyor belt may move transport 40 continuously through chamber 30 during the cooking/finishing process. Transport 40 may alternatively assume different forms such as specific areas on the conveyor belt adapted for signaling the arrival of a food product to cooking chamber 30 for cooking and/or finishing of food products.

The present invention having been thus described with particular reference to the preferred forms thereof, it will be obvious that various changes and modifications may be made therein without departing from the spirit and scope of the present invention as defined in the appended claims.

What is claimed is:

1. Food cooking apparatus for rapidly heating a food product, said food cooking apparatus comprising:
    a cooking chamber;
    a transport adapted to hold a food product,
    a transport medium along which said transport is movable between first and second positions located inside and outside of said cooking chamber, respectively;
    means for dispensing steam into said cooking chamber from a location above said food product to rapidly heat said food product during a cook cycle when said transport is in said first position;
    wherein said transport has a surface upon which said food product is disposed, said transport surface having at least one perforation through which condensation formed by said steam drains; and
    wherein said transport medium is shaped to catch said drained condensation and remove it from said cooking chamber.

2. Food cooking apparatus for rapidly heating a food product, said food cooking apparatus comprising:
    a cooking chamber;
    a transport adapted to hold a food product;
    a transport medium along which said transport is movable between first and second positions located inside and outside of said cooking chamber, respectively;
    means for dispensing steam into said cooking chamber from a location above said food product to rapidly heat said food product during a cook cycle when said transport is in said first position; and
    ejection means operable at the end of said cook cycle to automatically eject said transport from said cooking chamber along said transport medium to said second position.

3. Food cooking apparatus according to claim 2, wherein said ejection means includes a spring means that is operable at the end of said cooking cycle to apply a force to remove said tray from said cooking chamber.

4. Food cooking apparatus according to claim 2, further comprising magnetic means operable upon entry of said transport into said cooking chamber to hold said transport in said first position during said cooking cycle.

5. Food cooking apparatus according to claim 2, wherein said transport medium is inclined to the horizontal, whereby removal of said transport from said cooking chamber is gravity assisted.

6. Food cooking apparatus according to claim 2, wherein said transport includes wheels arranged to move said transport along said transport medium between said first and second positions.

7. Food cooking apparatus according to claim 2, wherein said means for dispensing steam includes a steam forming chamber disposed above said cooking chamber.

8. Food cooking apparatus according to claim 6, wherein said means for dispensing steam includes a plate that defines the bottom wall of said steam forming chamber and the top wall of said cooking chamber, wherein said plate has a plurality of holes extending therethrough, said steam passing through said holes to melt said cheese, and wherein said plate is a platen having a top surface that forms a bottom surface of said steam forming chamber and a bottom surface that forms a ceiling surface of said cooking chamber, said platen being adapted to be heated to a temperature substantially above the boiling temperature of water.

9. Food cooking apparatus according to claim 8, wherein said means for dispensing steam further includes:
    a lid sealed to said platen and together with said top surface defining said steam forming chamber;
    a plurality of bosses extending from said platen top surface into said steam forming chamber, different ones of said holes extending through different ones of said bosses; and
    water injection means adapted for connection to a source of water and arranged, when said platen is heated, to inject water onto said platen top surface in said steam forming chamber, said water vaporizing substantially instantaneously to form steam that pressurizes said steam forming chamber and exits said steam forming chamber via said holes into said food cooking chamber to melt to rapidly heat said food product.

10. A method for melting cheese on a surface of a food product, said method comprising:
    inserting said food product into a cooking chamber;
    producing pressurized steam by applying a quantity of water to a heated surface during only a first part of a cooking cycle.
    applying said pressurized steam from the top of said cooking chamber to said cheese; and
    holding said food product in said cooking chamber throughout said cooking cycle.

11. The method according to claim 10, wherein said water is applied for a time in the range from about 1.5 to 5.0 seconds.

12. The method according to claim 11, wherein said first part is about 20 to 25% of the cooking cycle.

13. The method according to claim 10, further comprising the step of automatically ejecting said food product from said cooking chamber at the end of said cooking cycle.

14. The method according to claim 10, further comprising the step of removing condensation produced by said steam from said cooking chamber.

15. The method according to claim 10 wherein said quantity of water is in the range of about two to four tablespoons.

\* \* \* \* \*